United States Patent
Lalesse et al.

(10) Patent No.: US 10,218,253 B2
(45) Date of Patent: Feb. 26, 2019

(54) MAGNETIC COUPLING ASSEMBLY

(71) Applicant: Zytec Technologies B.V., Vlaardingen (NL)

(72) Inventors: Robert Lalesse, Zevenaar (NL); Edwin Osterloh, Didam (NL); Dirk Geert Van Der Bijl, Etten-Leur (NL); Karel Vaclav Mucek, Vlaardingen (NL)

(73) Assignee: Zytec Technologies B.V., Vlaardingen (NL)

( * ) Notice: Subject to any disclaimer, the term of this patent is extended or adjusted under 35 U.S.C. 154(b) by 226 days.

(21) Appl. No.: 15/038,075

(22) PCT Filed: Nov. 20, 2014

(86) PCT No.: PCT/NL2014/050795
§ 371 (c)(1),
(2) Date: May 20, 2016

(87) PCT Pub. No.: WO2015/076673
PCT Pub. Date: May 28, 2015

(65) Prior Publication Data
US 2016/0301296 A1    Oct. 13, 2016

(30) Foreign Application Priority Data

Nov. 20, 2013 (NL) ..................... 2011824
Jul. 18, 2014 (NL) ..................... 2013220

(51) Int. Cl.
*H02K 49/04* (2006.01)
*H02K 7/06* (2006.01)

(52) U.S. Cl.
CPC ............. *H02K 49/046* (2013.01); *H02K 7/06* (2013.01); *H02K 2201/03* (2013.01); *H02K 2213/09* (2013.01)

(58) Field of Classification Search
CPC .... H02K 49/046; H02K 7/06; H02K 2201/03; H02K 2213/09
(Continued)

(56) References Cited

U.S. PATENT DOCUMENTS

| 5,834,872 | A | 11/1998 | Lamb |
| 5,880,548 | A * | 3/1999 | Lamb .................. H02K 49/046 310/103 |
| 6,791,219 | B1 * | 9/2004 | Eric ....................... H02K 29/08 310/83 |

FOREIGN PATENT DOCUMENTS

WO    WO 2013/009903 A2    1/2013

OTHER PUBLICATIONS

International Search Report issued in co-pending International Patent Application No. PCT/NL2014/050795, European Patent Office, dated Feb. 18, 2015, 3 pages.
(Continued)

*Primary Examiner* — Michael Andrews
(74) *Attorney, Agent, or Firm* — McDonnell Boehnen Hulbert & Berghoff LLP

(57) ABSTRACT

The invention relates to an adjustable magnetic coupling assembly for coupling of a first rotary shaft and a second rotary shaft, the magnetic coupling assembly comprising a first and second rotary hub connectable to the first shaft and second shaft, respectively and a central shaft, a first and a second rotatable inductor rotor connected to the central shaft, the inductor rotors being configured to be rotated by the central shaft and to be movable in axial direction along the central shaft by a positioning mechanism and a rotatable central magnet rotor connected to the second rotary hub and arranged centrally between the first and second rotatable inductor rotor. The assembly further comprises a positioning mechanism coupled to the first and second rotatable inductor
(Continued)

rotors and configured to selectively move the inductor rotors to adjust the axial distances between the magnet rotor and the respective inductor rotor.

21 Claims, 9 Drawing Sheets

(58) Field of Classification Search
USPC .............................. 310/95, 83, 99, 103, 105
See application file for complete search history.

(56) References Cited

OTHER PUBLICATIONS

Written Opinion issued in co-pending International Patent Application No. PCT/NL2014/050795, European Patent Office, dated Feb. 18, 2015, 5 pages.

* cited by examiner

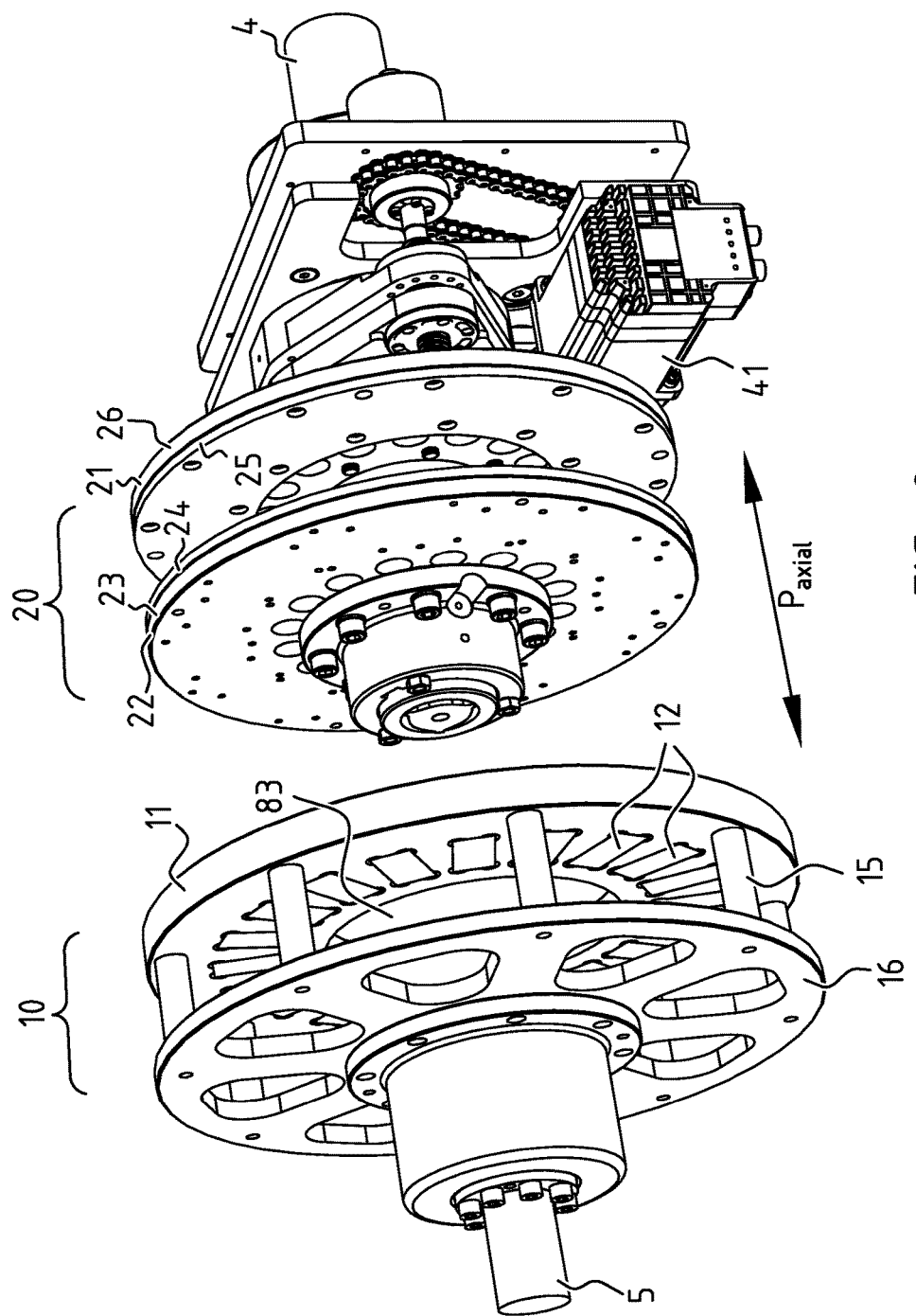

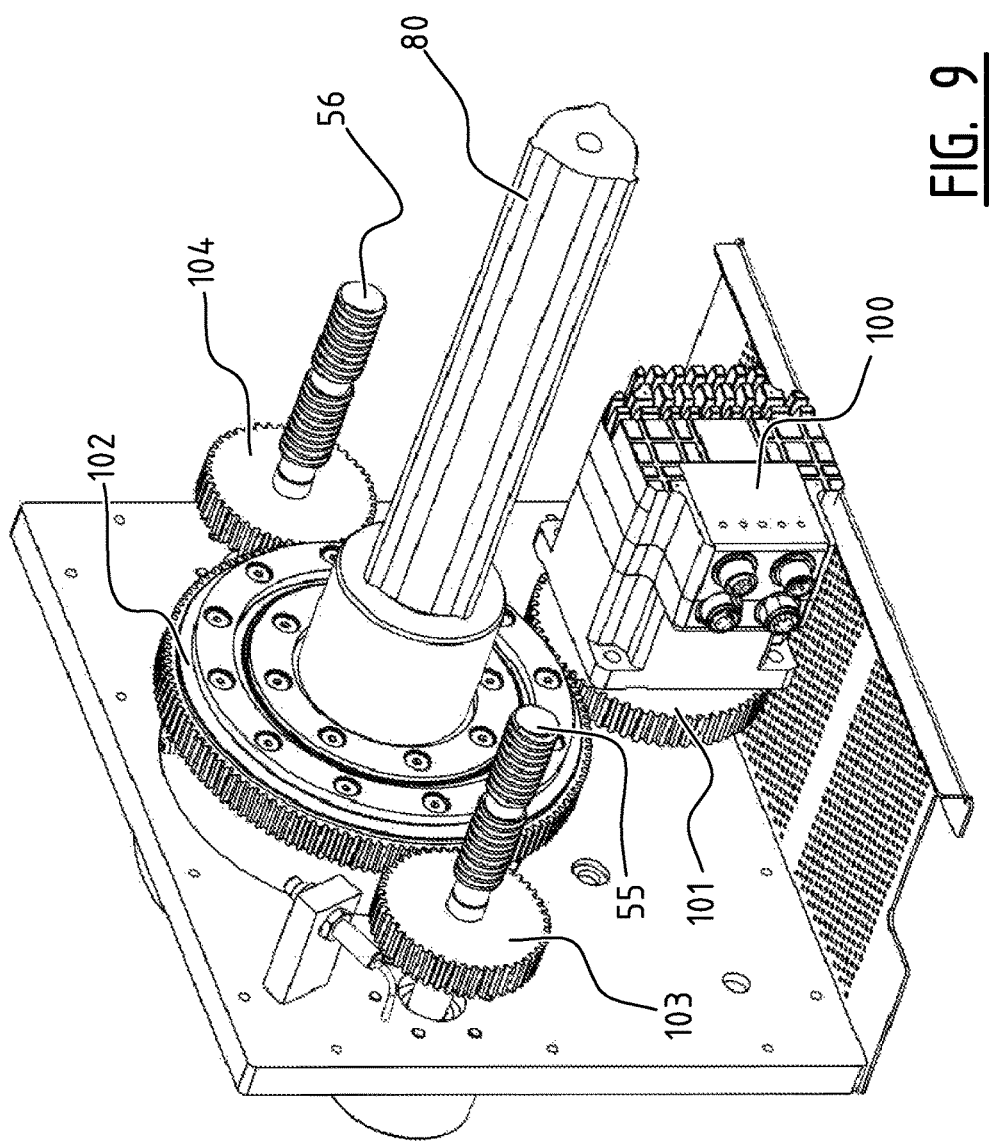

MAGNETIC COUPLING ASSEMBLY

This application is a National Stage Application of International Patent Application No. PCT/NL2014/050795, filed Nov. 20, 2014, which claims the benefit of, and priority to, Netherlands Patent Application No. 2011824, filed Nov. 20, 2013, and Netherlands Patent Application No. 2013220, filed Jul. 18, 2014, the contents of these applications being incorporated entirely herein by reference.

The present invention relates to a magnetic coupling assembly for coupling a first rotary shaft and a second rotary shaft.

Magnetic coupling assemblies for coupling a first shaft, for instance a drive or motor shaft, to a second shaft, for instance a load or machine shaft, are known as such. A magnetic coupling assembly may comprise two magnet rotors, with each magnet rotor having a respective set of permanent magnets. Each magnet rotor of the known magnetic coupling assembly is associated with at least one electromagnetic inductor rotor spaced apart from the magnet rotor. Torque may be transferred from the first shaft to the second shaft, with the speed of the load shaft reduced with respect to the speed of the drive shaft, without the drive shaft being in contact with the load shaft.

It is an object of the present invention to provide a magnetic coupling assembly wherein the disadvantages of prior magnetic couplings have been reduced.

It is a further object of the invention to provide a magnetic coupling assembly which is compact, reliable, efficient, easy to install and/or has relatively low maintenance costs.

At least one of the objects may be achieved in a magnetic coupling assembly for coupling of a first rotary shaft and a second rotary shaft, the magnetic coupling assembly comprising:
- a first rotary hub connectable to the first shaft;
- a second rotary hub connectable to the second shaft;
- a central shaft connected to or part of the first rotary hub;
- a first and a second rotatable inductor rotor connected to the central shaft, the inductor rotors being configured to be rotated by the central shaft and to be movable in axial direction along the central shaft by a positioning mechanism;
- a rotatable central magnet rotor comprising a set of permanent magnets, the central magnet rotor connected to the second rotary hub and arranged centrally between the first and second rotatable inductor rotor in order to transfer torque between the magnet rotor and the inductor rotors;
- a positioning mechanism coupled to the first and second rotatable inductor rotors and configured to selectively move the inductor rotors to adjust the axial distances between the magnet rotor and the respective inductor rotors.

In embodiments of the invention the first shaft is a motor shaft and the second shaft is a load (machine) shaft, while in other embodiments the first shaft is a load shaft and the second shaft is a motor shaft. In these embodiments the three rotor arrangement may make use of the available magnetic power in a highly efficient manner, with the two inductor rotors exposed to the front and back sides of each magnet in the central magnet rotor. In embodiments of the invention the torque that can be transferred between the shafts for a given magnet arrangement may be increased significantly.

In embodiments of the invention the coupling assembly is only supported on the first and second shafts. Since no further support, for instance a load shaft support, is needed, the assembly may be employed in many different situations and versatility of the coupling assembly is increased.

In general, adding weight to a shaft and/or overhanging the weight relative to the end of the shaft reduces the critical frequency of that shaft. If the critical frequency of a shaft is reduced into the operating speed range of the shaft, very high vibrations are likely and highly undesirable.

In many industrial situations, the motor has a stronger, larger diameter shaft than the load shaft. In embodiments of the invention the positioning mechanism is designed to be mounted on the motor shaft. Therefore weight is added primarily to the motor shaft so that the risk of vibrations may be reduced. Furthermore, the above-described embodiments of the invention may be relatively light weight relative to prior art coupling assemblies having two magnet rotors and two inductor rotors so that in these embodiments critical frequency situations may be better avoided. Furthermore, in accordance with embodiments of the invention, the specific arrangement of the positioning mechanism relative to the rotor assemblies provides for a relatively small distance from the load shaft to the centre of gravity of the magnet rotor. The arrangement may reduce the probability of critical frequency issues as well.

The adjustment of the air gaps may be performed in stationary mode when the drive shaft and motor shift do not rotate or during rotation of both shafts. By adjusting (varying) the axial distances between the faces of the central rotor and the inductor rotors or, in other words, by adjusting the air gap between the central rotor and the inductor rotors, the speed of the rotating load shaft may be controlled.

Furthermore, by using a single magnet rotor a low-weight and compact construction, requiring only a limited volume of magnetic material to achieve a suitable coupling, may be attained. This allows for easy installation and/or handling of the coupling assembly. A further advantage of using a limited number of parts is that generally the construction can be made more robust and needs less maintenance. The positioning mechanism also allows for easy operation, for instance in case of load matching (wherein the speeds of the load and drive are matched with predefined requirements).

According to a further embodiment the positioning mechanism is mounted via a bearing to the first rotary hub. This positioning mechanism remains stationary, even while the rotors are rotating. In other embodiments the positioning mechanism is mounted to the ground, for instance to a frame or pedestal supported on a floor. In this embodiment the total length of the coupling assembly may be reduced even further.

In embodiments of the invention the positioning mechanism is configured to move the first and second rotatable inductor rotors in unison and in opposing axial directions so as to vary the air gap with the central magnet rotor. In this manner the opposing axial forces exerted on parts of the positioning mechanism caused by the individual inductor rotors will be essentially equal, so long as the air gaps are equal, so that the resultant force on the positioning mechanism is very small. In embodiments of the invention the resultant force is reduced by a threaded spindle mechanism to a level at which the inductors may be moved manually to the desired positions, without having to use additional means such as heavy electric or hydraulic actuators.

In an embodiment of the invention the positioning mechanism is configured to control the axial position of the first inductor rotor via a first bearing, for instance a thrust bearing or a throw out bearing, arranged to only displace the first inductor rotor in an axial direction, and to control the axial position of the second inductor rotor via a second bearing, for instance a thrust bearing or a throw out bearing, arranged to only displace the second inductor rotor in an opposite axial direction. In this embodiment the axial forces on each of the first and second bearing is limited to the axial forces created by one inductor rotor so that wear of the bearings can be kept to a minimum.

In a further embodiment the first and second bearings are connected by a common threaded spindle. The common spindle may have right-hand and left-hand threads. This spindle may be rotatably driven by an actuator, such as a lever or handle for manual operation and/or a motor for motor-assisted operation. The actuator may be a pneumatic or hydraulic actuator, a motor, for instance an electric motor, etc. In a further embodiment the electric motor comprises a stepper motor. The stepper motor may be controlled by a motor controller integrated in the stepper motor, the motor controller being connected to an overall assembly controller. In other embodiments, however, the stepper motor is controlled by central controller only.

The motor controller may be connected to a temperature sensor arranged to generate a first sensor signal representative of the temperature of at least one of the inductor rotor and magnet rotor. When the temperature exceeds a predefined threshold, for instance 150 degrees Celsius, the assembly controller may change the operation of the assembly, for instance stopping the drive shaft, and/or the motor controller may change the operation of the stepper motor, for instance by or moving the rotors to their maximum gap positions.

Alternatively or additionally, the motor controller may be connected to a vibration sensor arranged to generate a second sensor signal representative of the vibration level of one or more parts of the coupling assembly. When the vibration level exceeds a predefined vibration level threshold, the motor controller may change the operation of the stepper motor, for instance by increasing the gap distance between the rotors and therefore to reduce the amount of torque so that the vibration level may be reduced.

In order to further reduce the stress on the parts of the positioning assembly and/or to provide a smooth and easy variation of the air gaps, the coupling assembly may comprise two or more spindles arranged to simultaneously displace both inductor rotors in opposing axial directions.

In a further embodiment the assembly comprises a control unit for controlling the positioning mechanism, for instance controlling the electric motor (such as an electric stepper motor) for rotating the spindles. In this way the control unit changes the speed of the second rotary shaft relative to the speed of the first rotary shaft by adjusting the axial distance between the magnet rotor and each of the inductor rotors.

An inductor rotor may comprise a non-magnetic electrically conductive material, for instance copper, aluminium, or brass, backed by a magnetic material, for instance iron or steel. Other materials and configurations may be used as well.

In embodiments of the invention the inductor rotors have the ability to move with minimal forces, to remain in concentric and square relationship to the central shaft, and to achieve precise positioning, while at the same time they transmit torque and are subject to axial magnetic loads. The ball spline design used in several embodiments of the invention has a low friction due to torsional loading, is substantially free-running in the axial directions, and provides good concentricity and face run-out to the inductor rotors during all operating conditions. However, other designs may offer similar advantages and achieve the same overall functions as the ball spline design.

Further advantages, features and details of the present invention will be elucidated on the basis of the following description of several preferred embodiments thereof. Reference is made in the description to the accompanying figures, in which:

FIG. 2 is an exploded side view in perspective of the embodiment of the magnetic coupling assembly of FIG. 1;

Figure 1:
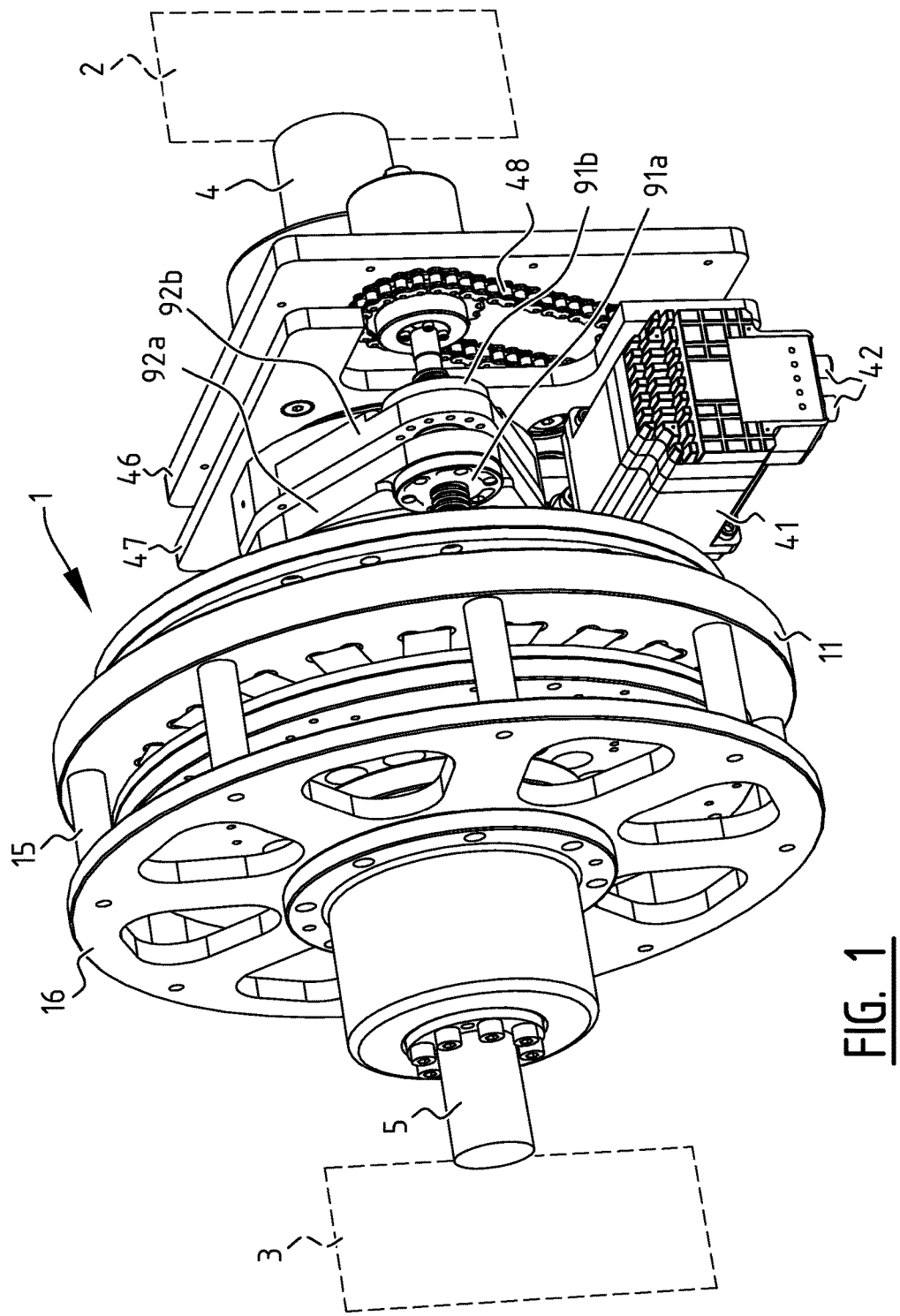
FIG. 1 is a perspective side view of an embodiment of a magnetic coupling assembly, connected between a motor and a load.
Figure 3C:
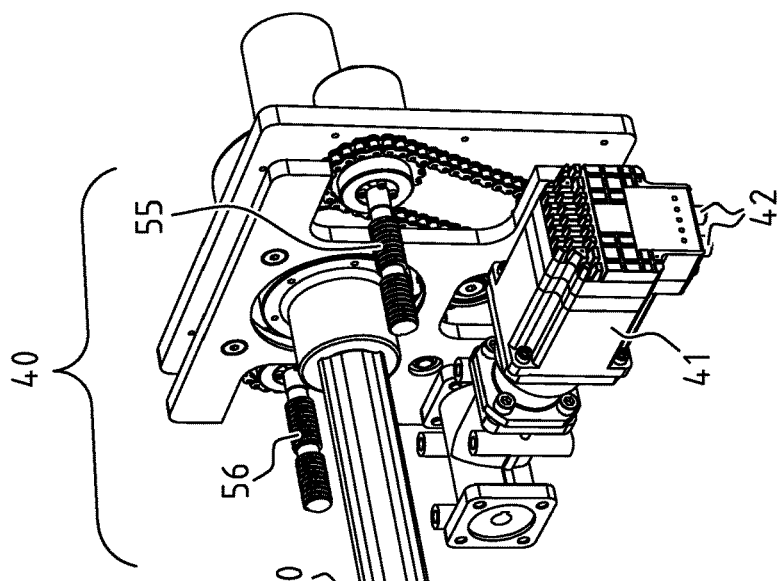
FIGS. 3A, 3B and 3C show further detailed exploded views of parts of the magnetic coupling assembly of FIGS. 1 and 2, without the magnet rotor assembly.
Figure 3B:
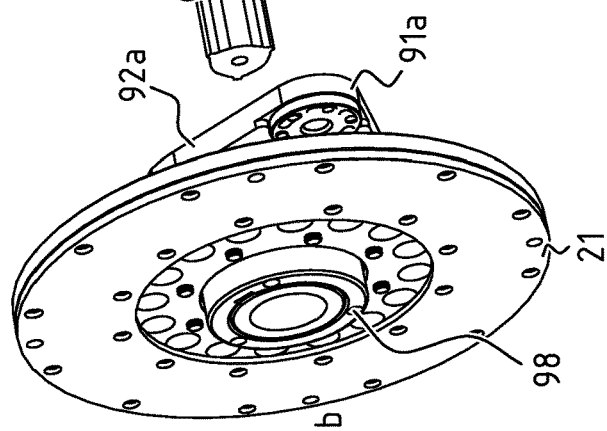
Figure 3A:
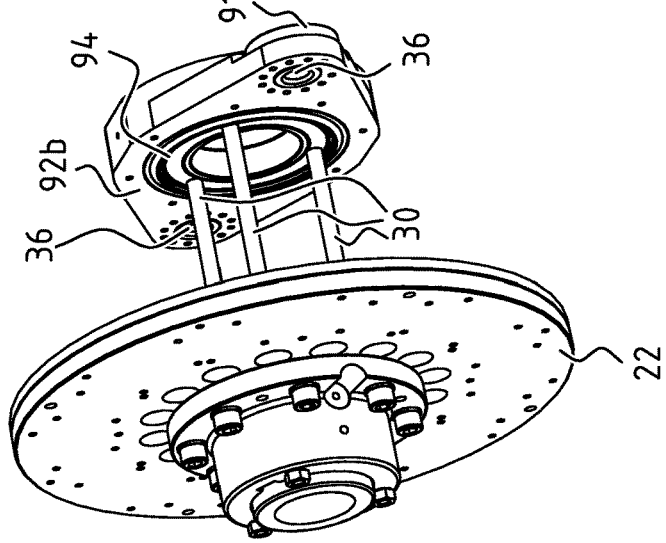
Figure 4:
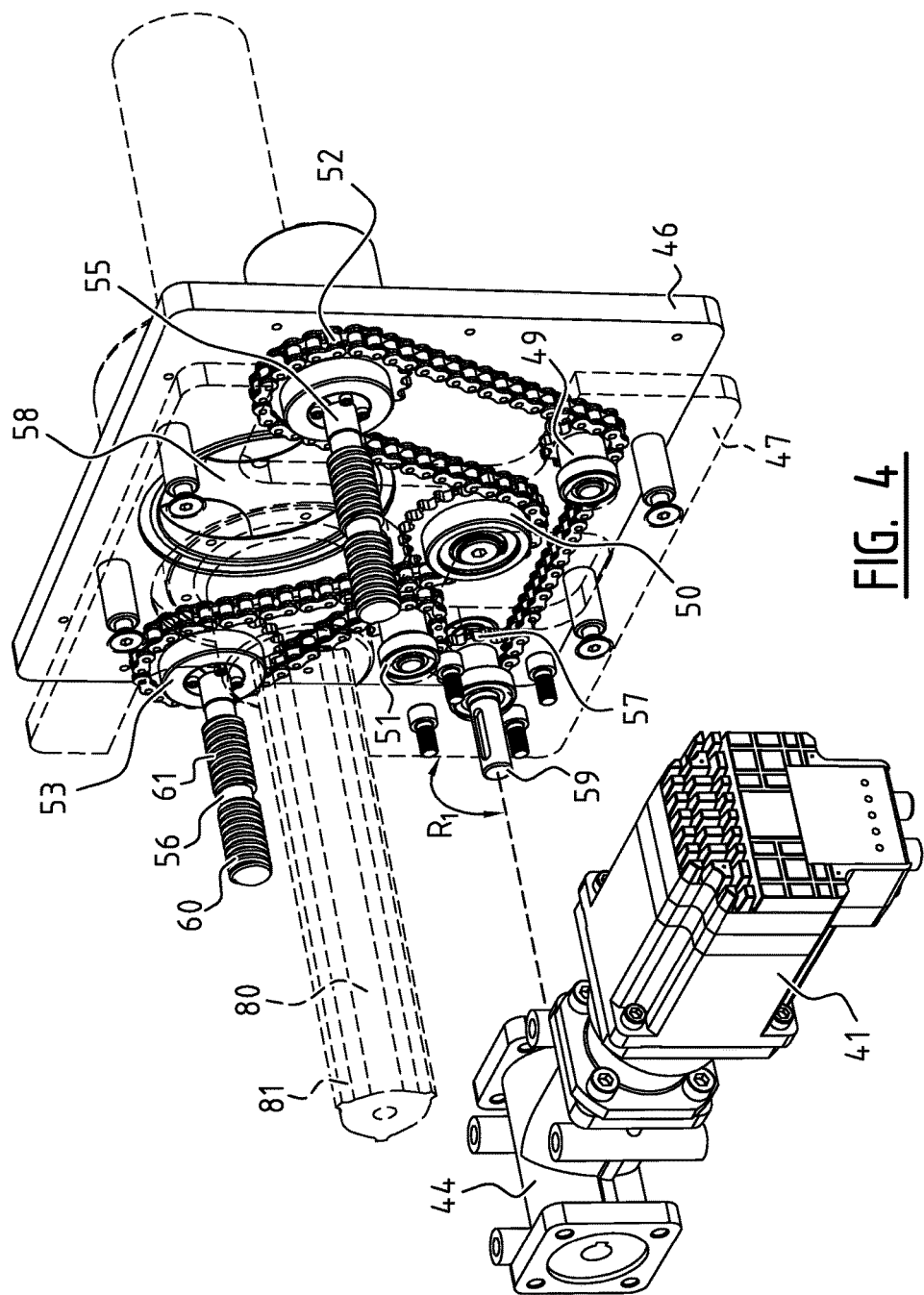
FIG. 4 is a further detailed exploded view of a part of the magnetic coupling assembly of FIGS. 1-3, without the magnet rotor and inductor assemblies.
Figure 5:
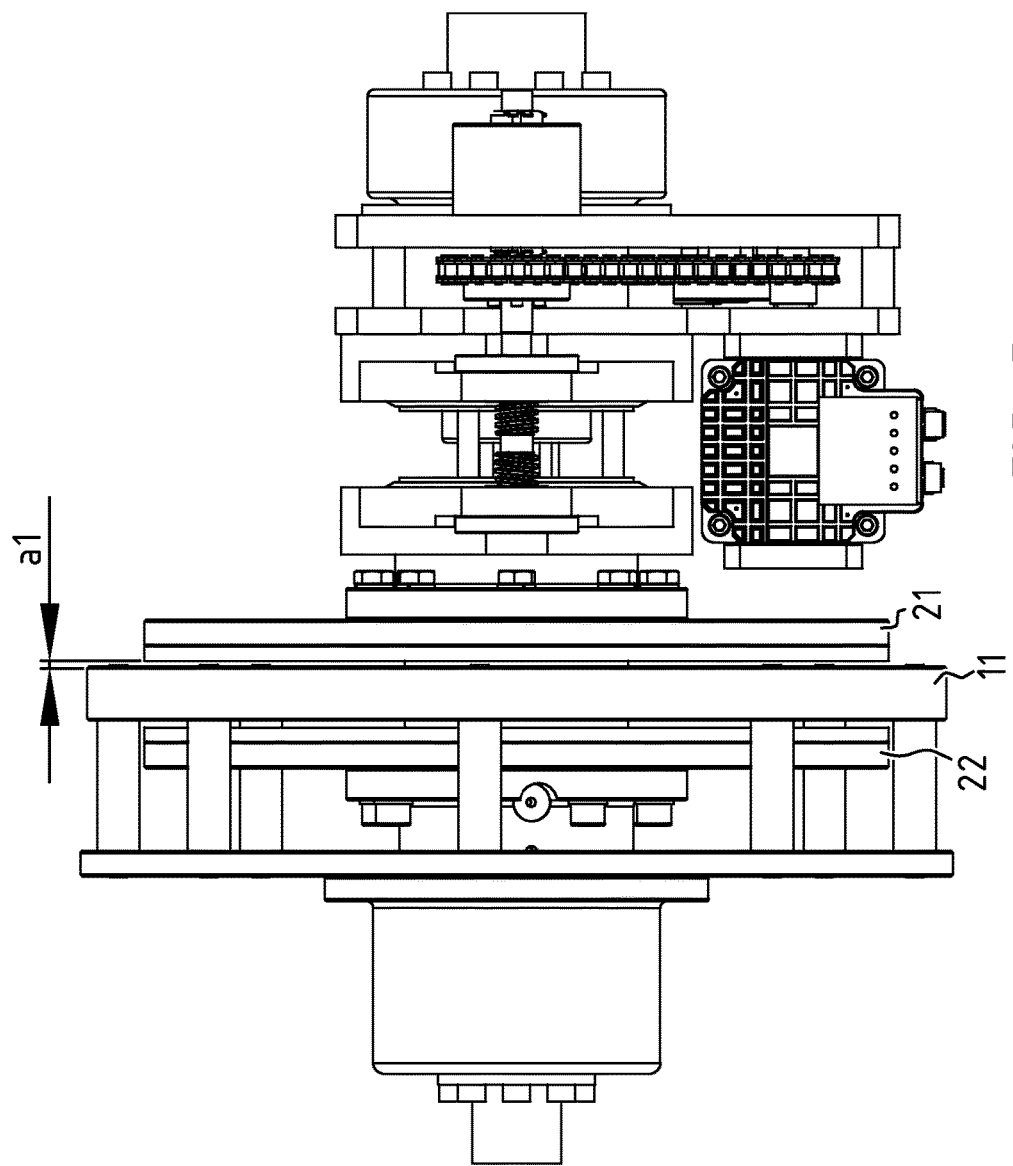
Figure 6:
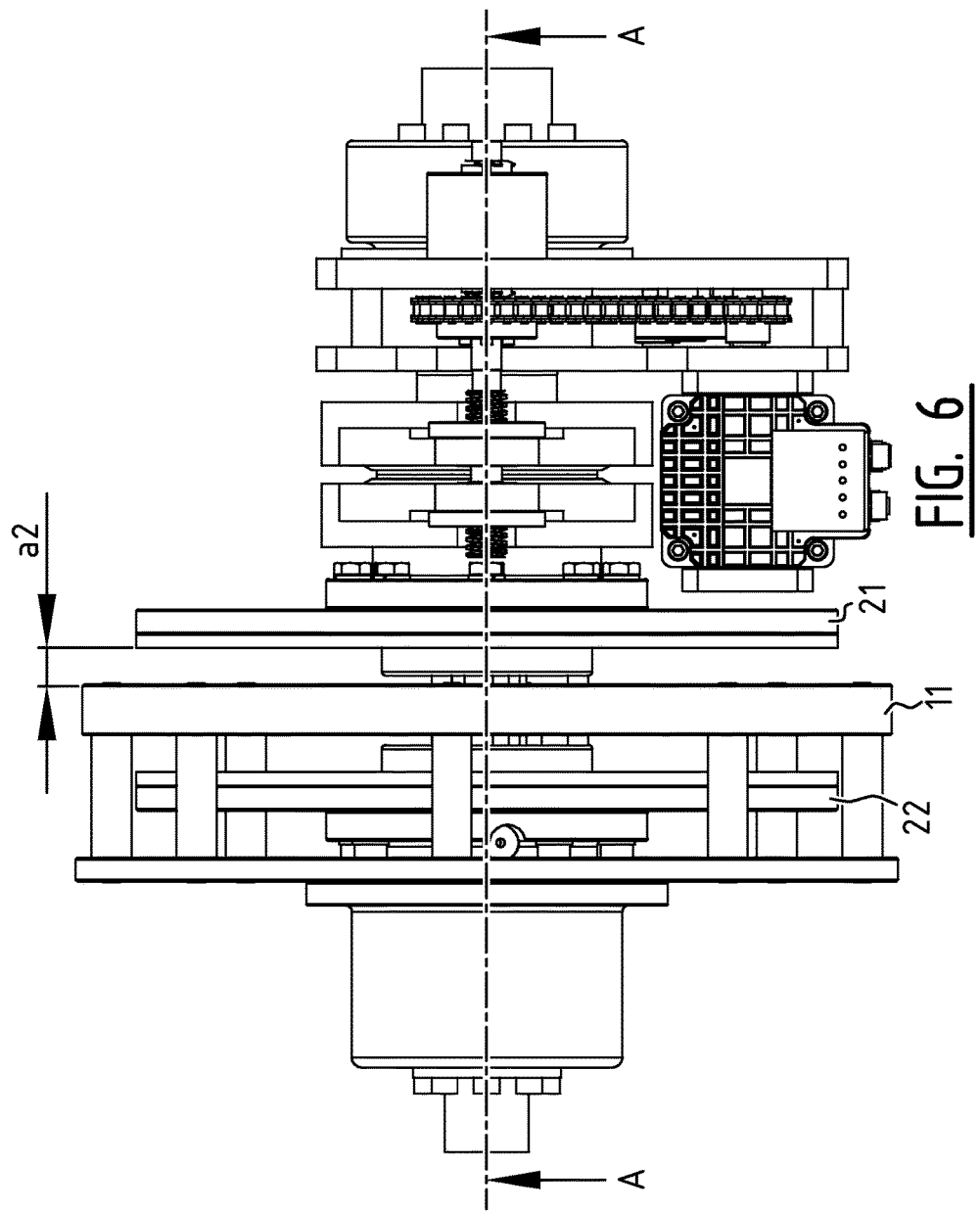
Figure 7:
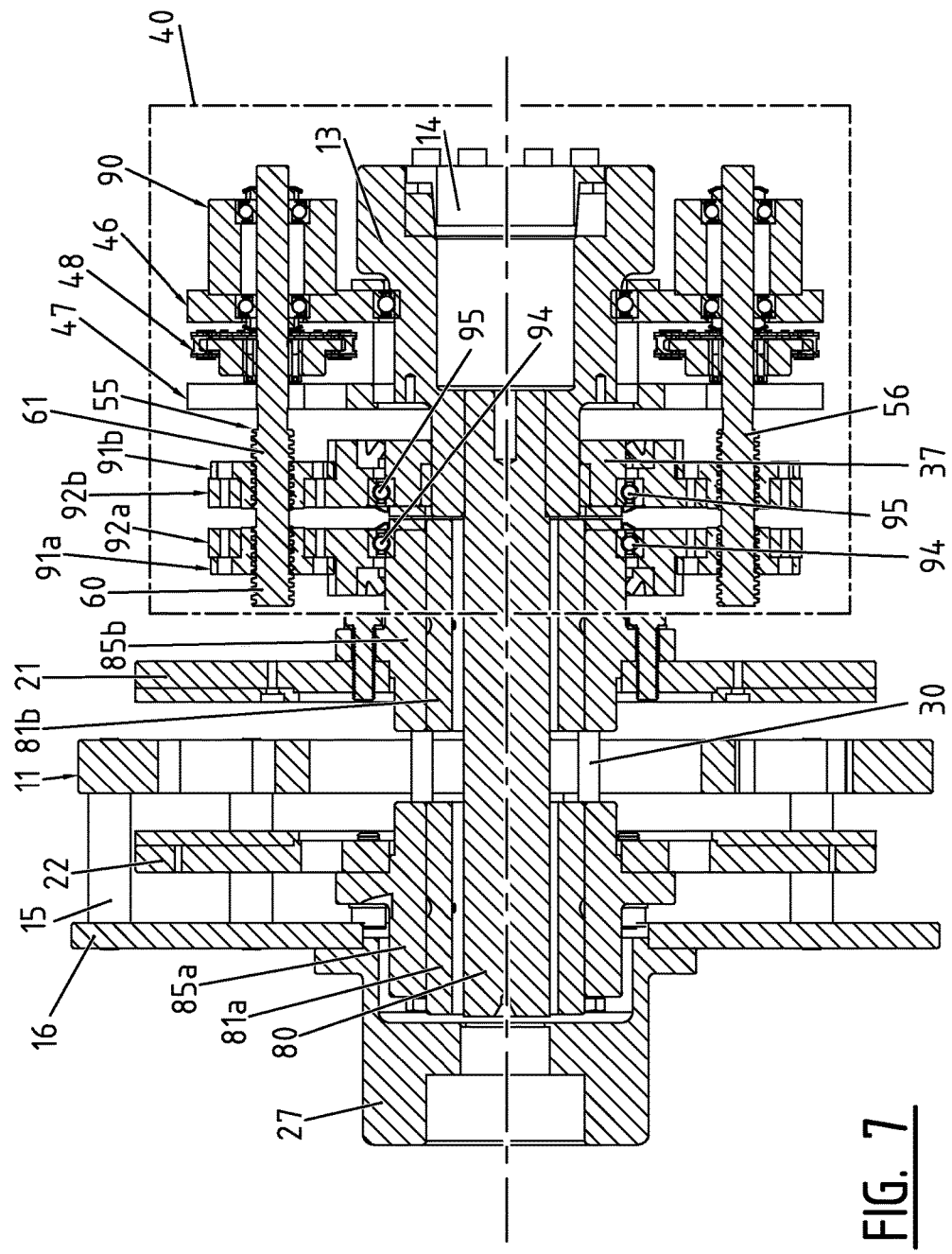
Figure 8:
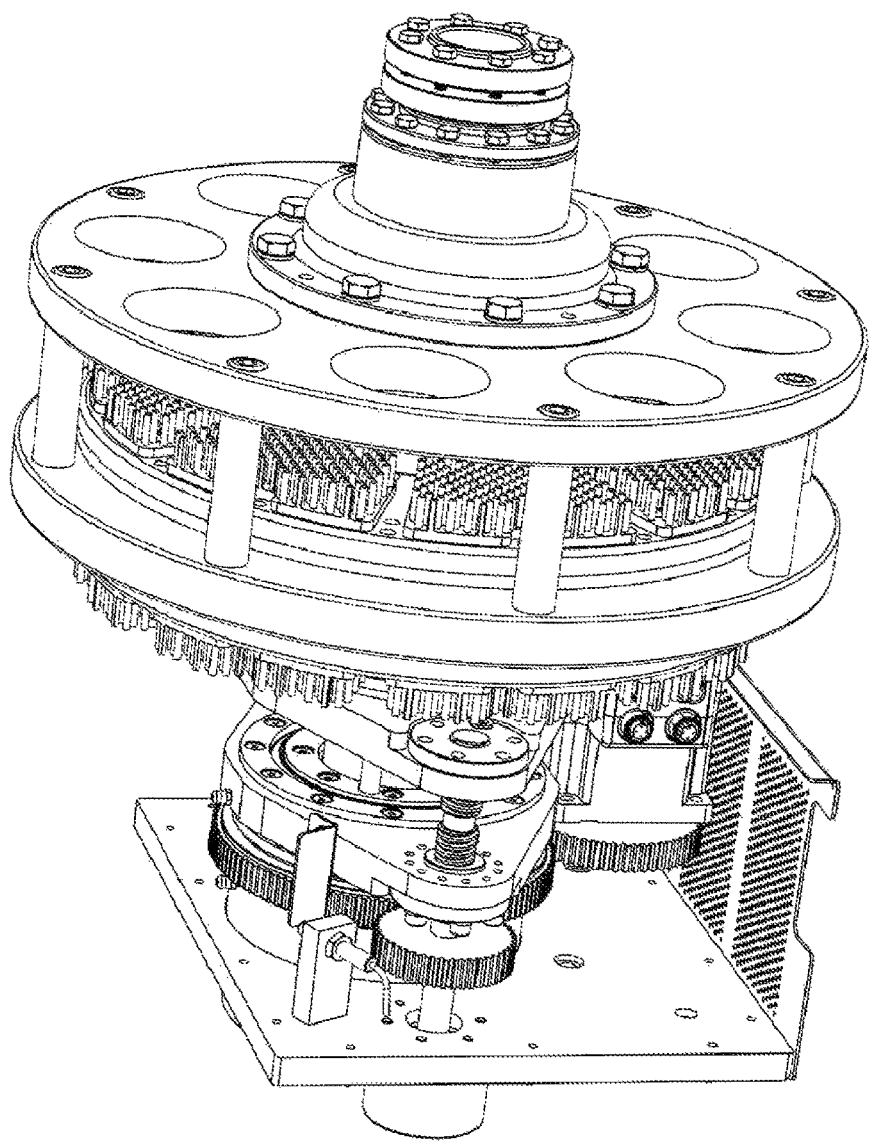

FIG. 5 a side view of the embodiment of FIGS. 1-4, with the inductor rotors in a small air gap position;

FIG. 6 the side view of FIG. 5, with the inductor rotors in a large air gap position;

FIG. 7 a longitudinal cross-section of the embodiment of the magnetic coupling assembly along line A-A of FIG. 6;

FIGS. 8 and 9 are perspective side views of a further embodiment of the magnetic coupling assembly.

When throughout the present specification reference is made to "a" bearing, this reference is intended to include two or more bearing (elements) or a bearing assembly.

The FIGS. 1-6 show an embodiment of a magnetic coupling assembly 1 according to an embodiment of the present invention. The magnetic coupling assembly is supported by an input shaft 4 (herein also referred to as a drive shaft or motor shaft 4) of a driving motor 2, for instance an electric engine, and by an output shaft 5 (herein also referred to as a load shaft or machine shaft) of a load, for instance a pump or similar device. The magnetic coupling assembly is configured to control the rotational speed of the load shaft 5, at a speed reduced from the rotational speed of the drive shaft 4 in an essentially contactless manner.

In the magnetic coupling assembly 1 a clearance exists between the input shaft 4 and output shaft 5 so that there is essentially no physical connection at any point between these shafts. The clearance allows the two shafts to rotate and transmit power while being slightly out of alignment without the vibration that would occur if they were connected by mechanical couplings. The positioning mechanism described herein makes it possible to maintain this clearance.

The drive shaft 4 and load shaft 5 are releasably connected to, for instance assembled on, respectively a motor side hub 13 and a load side hub 27 of the magnetic coupling assembly 1, for instance through means of respective clamping sleeves 14 and 28 or similar coupling devices.

The magnetic coupling assembly 1 comprises an inductor assembly 20 having two inductor rotors 21,22 connected to a common central shaft to rotate synchronously. The magnetic coupling assembly 1 also comprises a magnet rotor assembly 10. The magnet rotor assembly 10 is coupled to the motor drive shaft (alternatively, to the load shaft), while the two inductor rotors 21,22 are attached to the other shaft.

The magnet rotor assembly 10 has a single magnet rotor 11 arranged centrally between the two inductor rotors and a support rotor 16 for supporting the central magnet rotor 11. More specifically, the magnet rotor 11 is connected with a number of connection bars 15 to the support rotor 16, while the support rotor 16 is attached to the load side hub 27. This construction allows the central magnet rotor 11 to rotate freely around a central spline shaft 80, extending through a central opening 83 in the magnet rotor 11. The opening 83 has a diameter lager than the diameter of the spline shaft 80 so as to allow the magnet rotor 10 to rotate with respect to the rotating spline shaft 80.

The magnet rotor 11 contains a number of permanent magnets 12, loaded with poles axially outward facing in an alternating north/south pattern and positioned near the outer circumference of the rotor. In a specific embodiment the purpose of the magnet rotor structure is to hold the magnets in place using non-magnetic material, and to support the magnets in consideration of magnetic torsional and axial forces and centrifugal structural forces. A rotor may be arranged around the perimeter of the magnets to hold them in place for centrifugal force reasons.

The permanent magnets are spaced by air gaps from the respective inductor rotors 21,22. Rotation of the first or second shaft results in rotation of the other shaft by magnetic action without there being any direct mechanical connection between the first and seconds shafts. More specifically, torque may be transferred between the magnet rotor and the inductor rotors and thereby between the first and second shaft via Lenz's law.

The central spline shaft 80 of the magnetic coupling assembly 1 is connected to the motor side hub 13. The spline shaft 80 in combination with one or more spline bushings 81a,81b constitute a linear motion bearing. The linear motion bearing enables low friction linear motion along the spline shaft 80 while allowing the shaft 80 to transmit torque simultaneously to the bushings. In a specific embodiment the spline shaft 80 has a number of longitudinal grooves 81 along the length of the shaft. The grooves of the spline shaft 80 mesh with grooves in two mating spline bushings (ball spline or similar), maintaining the angular correspondence between the spline shaft 80 and the spline bushings 81a,81b. In other words, the spline bushings 81a,81b may be moved substantially freely in axial direction (i.e. in longitudinal direction along the shaft) while rotation of the spline shaft is transferred to the spline bushings.

The inductor rotors 21,22 of the inductor assembly 20 comprise a self-supporting, non-magnetic electrically conductive material (copper, aluminium, brass, etc.), preferably in the shape of a conductive ring 24,25, backed by a magnetic material (iron or steel) 22,26, respectively. Each of the inductor rotors 21,22 is attached to a respective one of the spline bushings 81a,81b through use of respective hubs 85a,85b. The spline bushings 81a,81b allow the inductor rotors to be slid in axial direction ($P_{axial}$) along the spline shaft 80 while transmitting torque, i.e. both during rotation of the spline shaft 80 and when the spline shaft 80 is stationary. The rotation of the spline shaft 80 causes the inductor rotors 21,22 to rotate simultaneously.

The inductor rotors 21 and 22 may be arranged at substantially equal axial distances (i.e. showing equal air gaps) from the central magnet rotor 11. The distances between each inductor rotor 21,22 and the central magnet rotor 10 may be adjusted using a stationary positioning mechanism 40. The positioning mechanism 40 is configured to selectively move the inductor rotors 21,22 more apart so as to widen the air gap between the central magnet rotor 10 and the material of the inductor rotors 21,33 (FIG. 6, air gap $a_2$) or to move the inductor rotors 21,22 towards each other to narrow the air gaps (FIG. 5, air gap $a_1$, wherein $a_2 > a_1$).

Gap adjustment varies the strength of the magnetic flux field interacting with the inductor rotors (the inductor rotors comprising electro-conductive (copper, aluminium, etc.) material and magnetically conductive (steel, iron, etc.) material and this variation of the magnetic field strength results in a change of the rotational force (torque) between the two rotor assemblies 10,20. This continuously adjustable torque control allows speed control of the rotating load. For instance, the difference in speed between the magnet rotor and inductor rotors and the amount of the air gaps between the opposing faces of the inductor rotors and magnet rotor may produce a force (or torque) between the two rotor assemblies 10,20 that is predictable and smoothly continuous as the relative speed and/or air gap changes. When the inductor rotor speed is fixed according to the motor speed, the positioning mechanism 40 may control the speed of the rotating load simply by varying the air gap between the magnet rotor and each of the two inductor rotors.

The axial force between each inductor rotor 21,22 and the magnet rotor 10 varies in relation to the air gap and the relative speed between the rotors. Even in stationary condition the axial force between each inductor rotor and the central magnet rotor is considerable. For this reason, the positioning mechanism 40 is able to position and hold both inductor rotors 21,22 accurately relative to the magnet rotor 10 in all operating conditions to allow the load speed to be accurately controlled.

The positioning mechanism 40 comprises support plates 46,47 having a central opening 58 in which the motor hub 13 for receiving the motor shaft 4 is accommodated. Attached to the support plate 46 are two bearing retainers of a bearing 90 for rotatably supporting a first spindle 55 and a second spindle 56. Each of the spindles 55,56 is provided with a gear element 52,53 engaged with a driving chain 48 which may cause the respective spindles 55,56 to rotate.

Referring to FIG. 4 the chain is guided along further gear wheels 49,50,51 and a driving gear wheel 57 attached to a rotating drive element 59. The driving chain 48 may be driven in two directions (directions R1) by the rotating drive element 59. Rotating the drive element 59 in a direction causes both spindles 55,56 to rotate synchronously in the same direction.

The drive element 59 is connected to an angle transmission element 44 coupled to a stepper motor 41, for instance an electric stepper motor having terminal 42 to be connected to a suitable voltage source (not shown in the figures). The stepper motor 41 may be controlled by a control unit, for instance a microcontroller, computer, or similar device, and may drive the drive element 59, for instance subject to the desired speed of the driven load. Additionally to the motor for driving the drive element 59 (or as an alternative for the motor) a handle (not shown in the figures) may be provided to rotate the spindles manually.

Each of the spindles 55,56 is provided with external left hand screw thread portion 60 and right hand screw thread portion 61. Screw thread portion 60 is arranged to move the inductor rotor 22 in axial direction ($P_{axial}$, FIG. 2), while screw thread portion 61 is arranged to move the inductor rotor 21 in an opposing axial direction. The screw thread portions 60,61 of each spindle 55,56 engage internal thread portions of respective flange nuts 91a,91b. The flange nuts 91a,91b are attached in openings 36 of positioning plates 92a,92b, respectively. Rotation of a spindle 55, 56 therefore causes the positioning plates to be moved in opposing axial directions, i.e. the positioning plates are moved away from each other or towards each other.

Between positioning plate 92a and the hub 85b a bearing, for instance a throw out bearing 94, is arranged so that the hub 85b and the inductor rotor 21 may rotate relative to the positioning plate 92a. Similarly, between the positioning plate 92b and the hub 85a a further bearing, for instance throw out bearing 95, is arranged. The bearing 95 is connected to a slide bearing 37 and three axial rods 30 evenly distributed around the spline shaft 80. One end of each axial rod is attached to slide bearing 37 while the other end of each rod is attached to the hub 85a. The rod 30 extends in axial direction through openings 98 (FIG. 3) provided in the spline bushing 81b so that the rods may be moved in a reciprocating manner in axial direction. In this manner the hub 85a and the inductor rotor 22 may rotate relative to the positioning plate 92b while the positioning plate enables an axial movement of the inductor rotor 22. More specifically, the inner side of the throw out bearing is attached to the rotatable inductor rotor, while the outer side of the throw out bearing is attached to the non-rotatable positioning mechanism. Rotation of the right/left thread portions of the spindles 55,56 causes the two throw out bearings 94,95 to move equally in opposite directions relative to a stationary position, for instance the position of bearing 90, and as a consequence the air gaps expand or contract equally on both sides of the central magnet rotor.

This arrangement limits the axial forces exerted on each throw-out bearing to the axial forces created by one inductor rotor. A further advantage is that the axial force on the bearing 90 are small, being only the difference between the axial force on the two throw-out bearings 94,95 since the throw-out bearing forces are roughly of equal magnitude and in opposite directions.

In the embodiments described above the positioning mechanism 40 is mounted to the motor hub 13. In other embodiments the positioning mechanism is mounted directly or indirectly to the ground, for instance to a frame supported on the floor. The positioning mechanism would be essentially the same. An advantage of supporting the positioning mechanism on the ground is a lightening and shortening of the length of the inductor assembly.

In the embodiment of the coupling assembly shown in the figures the coupling assembly is fully supported by the motor shaft 4 and the load shaft 5. In most cases, no further supports are needed. Where the load shaft is not capable of supporting the weight of the magnet rotor assembly, a simple shaft support may be is needed. This shaft support does not impact the design or operation of the coupling assembly. Furthermore, the actuator (i.e. the motor 41, chain 48, spindles 55,56, bearings 94,95) may be fully integrated in the magnetic coupling assembly, enabling plug-and-play capabilities for the coupling assembly.

FIGS. 8 and 9 show a further embodiment of the magnetic coupling assembly. This embodiment corresponds to the earlier described embodiments of FIGS. 1-7 except for the actuator configured to actuate the positioning mechanism. The actuator in this embodiment comprises an electric motor 100, for instance a stepper motor. The actuator further comprises a first fear wheel 101, a second gear wheel 102 and gear elements (wheels) 103,104. The first gear wheel 101 engages upon the centrally arranged second gear wheel 102. The second gear wheel is arranged to be freely rotatably around the central spindle shaft 80. The gear elements 103,104 are mounted to the spindles 55,56, respectively. The gear elements 103,104 are in engaging relationship with the central, second gear wheel 102. Actuation of the electric motor 100 thereby causes the spindles 55,56 to rotate in opposite rotational directions.

The present invention is not limited to the embodiments thereof described herein. The rights sought are rather determined by the following claims, within the scope of which numerous modifications and adaptations can be envisaged.

The invention claimed is:

1. Magnetic coupling assembly for coupling of a first rotary shaft and a second rotary shaft, wherein the first rotary shaft is a motor shaft and the second rotary shaft is a load shaft, the magnetic coupling assembly comprising:
   a motor side rotary hub connectable to the motor shaft;
   a load side rotary hub connectable to the load shaft;
   a first rotatable inductor rotor and a second rotatable inductor rotor;
   a single central magnet rotor connected to the load side rotary hub, the central magnet rotor having two opposite sides facing in opposite axial directions and comprising a set of permanent magnets arranged in the central magnet rotor to provide a magnetic field extending from both opposite sides of the central magnet rotor, wherein the central magnet rotor is arranged centrally between the first and second rotatable inductor rotors in order to transfer torque between the central magnet rotor and the first and second rotatable inductor rotors;
   a positioning mechanism coupled to the first and second rotatable inductor rotors and configured to selectively move the first and second inductor rotors to adjust axial distances between the central magnet rotor and the respective inductor rotors; and
   a central shaft connected to or part of the motor side rotary hub, the first and second rotatable inductor rotors being connected to the central shaft, the first and second inductor rotors being configured to be rotated by the central shaft and to be movable in axial direction along the central shaft by the positioning mechanism.

2. Assembly as claimed in claim 1, wherein the positioning mechanism is mounted to the motor side rotary hub.

3. Assembly as claimed in claim 1, wherein the positioning mechanism is connected to the ground.

4. Assembly as claimed in claim 1, wherein the positioning mechanism is configured to move the first and second rotatable inductor rotors in unison and in opposing axial directions so as to vary air gaps with the central magnet rotor.

5. Assembly as claimed in claim 1, wherein the positioning mechanism is configured to control the axial position of the first inductor rotor via a first bearing arranged to only displace the first inductor rotor in an axial direction, and to control the axial position of the second inductor rotor via a second bearing arranged to only displace the second inductor rotor in an opposite axial direction.

6. Assembly as claimed in claim 5, wherein a first inner portion of the first bearing is connected to the first inductor rotor and a first non-rotatable outer portion of the first bearing is connected to the positioning mechanism, and
   a second inner portion of the second bearing is connected to the second inductor rotor and a second non-rotatable outer portion of the second bearing is connected to the positioning mechanism.

7. Assembly as claimed in claim 6, wherein the first and second non-rotatable outer portions of the first and second bearings, respectively, are connected to a common spindle rotatably driven by an actuator.

8. Assembly as claimed in claim 7, wherein the spindle is supported by a bearing assembly that holds the spindle in a non-rotating fixed axial relation to the central shaft.

9. Assembly as claimed in claim 7, wherein the positioning mechanism is configured so that rotation of the spindle causes equal and opposite axial movement of the two inductor rotors.

10. Assembly as claimed in claim 7, wherein the actuator comprises a motor for driving the one or more spindles.

11. Assembly as claimed in claim 10, wherein the motor comprises an electric motor and a motor controller integrated with the electric motor, wherein the motor controller is connected to at least one of:
- a temperature sensor arranged to generate a first sensor signal representative of the temperature of at least one of the inductor rotor and magnet rotor; or
- a vibration sensor arranged to generate a second sensor signal representative of the vibration level of one or more parts of the coupling assembly;
- the motor controller being configured to control the operation of the stepper motor in dependence of at least one of the first and second sensor signal.

12. Assembly as claimed in claim 7, wherein the actuator is a pneumatic or hydraulic actuator.

13. Assembly as claimed in claim 1, comprising two or more spindles arranged to simultaneously displace both inductor rotors in opposing axial directions.

14. Assembly as claimed in claim 1, comprising a control unit configured to change the speed of the load shaft relative to the speed of the motor shaft by adjusting the axial distance between the central magnet rotor and each of the inductor rotors.

15. Assembly as claimed in claim 1, wherein the first and second inductor rotors comprise a non-magnetic electrically conductive material backed by a magnetic material.

16. Assembly as claimed in claim 1, wherein the motor shaft applies a first torque to the first and second inductor rotors, the first and second inductor rotors apply a second torque to the central magnet rotor, and the central magnet rotor applies a third torque to the load shaft.

17. Assembly as claimed in claim 1, comprising an actuator configured to actuate the positioning mechanism.

18. Assembly as claimed in claim 17, wherein the actuator includes at least one of a motor or a handle.

19. Assembly as claimed in claim 1, comprising at least one more rotatable magnet rotor, each rotatable magnet rotor comprising a set of permanent magnets.

20. Assembly as claimed in claim 1, wherein the central magnet rotor is arranged between the first and second rotatable inductor rotors so as to face both the first and second rotatable inductor rotors, and the set of permanent magnets are loaded with poles axially outward to both the first and second inductor rotors.

21. Assembly as claimed in claim 1, wherein the positioning mechanism comprises a plurality of spindles and positioning plates having internal thread portions engaged by thread portions of the spindles, wherein the spindles of the positioning mechanism are arranged at different positions relative to the central shaft to apply axial forces at corresponding positions on the positioning plates to cause the positioning plates to be moved in opposing axial directions upon rotation of the spindles.

* * * * *